(12) United States Patent
Chen

(10) Patent No.: US 8,435,312 B2
(45) Date of Patent: May 7, 2013

(54) CALCIUM HEXABORIDE ANODES FOR ELECTROCHEMICAL CELLS

(75) Inventor: Sung-Wei Chen, Singapore (SG)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/123,612

(22) PCT Filed: Oct. 20, 2010

(86) PCT No.: PCT/SG2010/000402
§ 371 (c)(1),
(2), (4) Date: Oct. 11, 2011

(87) PCT Pub. No.: WO2012/053972
PCT Pub. Date: Apr. 26, 2012

(65) Prior Publication Data
US 2012/0100460 A1    Apr. 26, 2012

(51) Int. Cl.
*H01M 4/24*    (2006.01)
(52) U.S. Cl.
USPC ............... 29/623.1; 429/405; 429/218.1
(58) Field of Classification Search ............... 429/405, 429/218.1; 29/623.1
See application file for complete search history.

(56) References Cited

U.S. PATENT DOCUMENTS

| | | |
|---|---|---|
| 3,755,181 A | 8/1973 | Henricks |
| 3,980,495 A | 9/1976 | Roche et al. |
| 4,585,580 A | 4/1986 | Donohue |
| 5,948,558 A * | 9/1999 | Amendola ............ 429/50 |
| 6,027,832 A | 2/2000 | Takahashi et al. |
| 7,589,047 B1 | 9/2009 | Uribe et al. |
| 2002/0177042 A1* | 11/2002 | Amendola .......... 429/218.1 |
| 2008/0261094 A1 | 10/2008 | Licht et al. |

FOREIGN PATENT DOCUMENTS

| | | |
|---|---|---|
| WO | WO-99/31741 | 6/1999 |
| WO | WO-2010/025053 | 3/2010 |
| WO | WO-2010/132042 | 11/2010 |

OTHER PUBLICATIONS

Baruah, B. et al., "Vanadate chelate esters of monoionized diols and carbohydrates," Coordination Chemistry Reviews, 2003, vol. 237, pp. 135-146.
International Search Report and Written Opinion for PCT/SG2010/000402 mailed Jan. 13, 2011.
Licht, S. et al., "Renewable Highest Capacity VB2/Air Energy Storage," Chem. Commun., 2008, pp. 3257-3259.
Liu, S. et al., "A Novel Additive to Improve the Performance of LiFePO4 in Li-ion Battery," ECS Transactions, 2006, vol. 2, No. 27, pp. 17-22.
"Rejuvenating Lead Acid Batteries," Printed on Mar. 16, 2011, Retrieved from the Internet: <URL:http://www.sweller.co.uk/mz/electrics/elc_edta.html>, 2 pages.
Netz, A. et al., "Investigations of a number of alternative negative electrode materials for use in lithium cells," Ionics, No. 7, 2001, pp. 433-439.
Otani, S., "Preparation of $CaB_6$ Crystals by the Floating Zone Method," Journal of Crystal Growth, 1998, vol. 192, pp. 346-349.

(Continued)

*Primary Examiner* — Gregg Cantelmo
(74) *Attorney, Agent, or Firm* — Foley & Lardner LLP

(57) ABSTRACT

An electrochemical cell includes an anode containing calcium hexaboride, where the electrochemical device is an alkaline cell or an air cathode cell.

22 Claims, 1 Drawing Sheet

OTHER PUBLICATIONS

Shi, L. et al., "Low Temperature Synthesis and Characterization of Cubic $CaB_6$ Ultrafine Powders," Chemistry Letters, 2003, vol. 32, No. 10, pp. 958-959.

Xu, T.T. et al., "Single-Crystal Calcium Hexaboride Nanowires: Synthesis and Characterization," Nano Letters, 2004, vol. 4, No. 10, pp. 2051-2055.

Yu, X. et al., "Zirconia Coating Stabilized Super-Iron Alkaline Cathodes," Journal of Power Sources, 2007, vol. 173, pp. 1012-1016.

McGraw, L.D., et al., "The Investigation of New Electrochemical Systems," First Quarterly Report, Mar.-Jun. 1, 1953, No. 1, Battelle Memorial Institute, downloaded from http://www.dtic.mil/dtic/tr/fulltext/u2/014500.pdf, 36 pp.

* cited by examiner

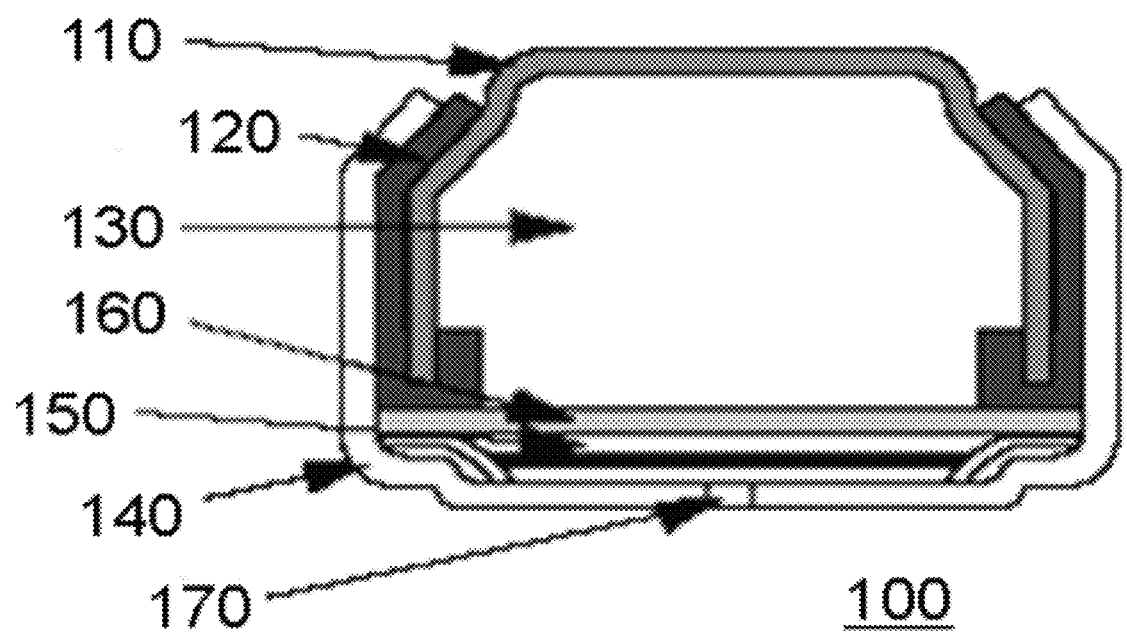

CALCIUM HEXABORIDE ANODES FOR ELECTROCHEMICAL CELLS

CROSS-REFERENCE TO RELATED APPLICATIONS

The present application is a U.S. national stage application claiming the benefit of International Application No. PCT/SG2010/000402, filed on Oct. 20, 2010, the entire contents of which is incorporated herein by reference in its entirety.

FIELD

The present technology is generally related to electrochemical devices employing calcium hexaboride as an anode material.

SUMMARY

In one aspect, an electrochemical cell is provided that includes an anode including calcium hexaboride, where the electrochemical cell is an alkaline cell or an air cathode cell. In some embodiments, the electrochemical cell is an alkaline cell. In some embodiments, the electrochemical cell also includes a cathode including a metal, $MnO_2$, $CrO_3$, $KMnO_4$, a peroxide, a metal chlorate, metal bromate, or metal iodate. In some embodiments, the electrochemical cell also includes an electrolyte including sodium hydroxide, potassium hydroxide, or a polymer. In some embodiments, the cell also includes a detergent, a chelator, a phosphate, a phosphonate, a quaternary ammonium salt, or a polymer.

In some embodiments, the electrochemical cell is an air cathode cell. In such embodiments, the electrochemical cell also includes an electrolyte that includes sodium hydroxide or potassium hydroxide. In some embodiments, the cell also includes a gelling agent, a stabilization agent, or a scavenging agent. Examples of gelling agents include, without limitation, polymers of methacrylic acid and copolymers of methacrylic acid with maleic acid, fumaric acid, and the like, or the salts of the polymers. Examples of stabilization or scavenging agents include, without limitation, anionic, cationic, amphoteric, or non-ionic surfactants, alcohols, ammonium salts, saccharides, and polysaccharides.

In some embodiments, the calcium boride includes a coating. In some embodiments, the coating includes a metal oxide, a carbon coating, or a polymer coating. In some embodiments, the coating includes a carbon coating of diamond-like carbon or amorphous carbon. As used herein, diamond-like carbon is carbon having a network of predominately $sp^3$ hybridized carbon, with mixtures of cubic and hexagonal polytropes of diamond in various proportions. Diamond-like carbon possesses some of the physical and chemical properties of diamond; they have higher strength and higher proportions of $sp^2$ hybridized carbons than amorphous carbon, and are more conformal than crystalline diamond. In some embodiments, the coating includes a metal oxide coating selected from the group consisting of $ZrO_2$, $TiO_2$, $SrO$, $La_2O_3$, and $ZnO$.

In another aspect, a battery is provided including any of the electrochemical cells described herein.

In another aspect, a battery is provided including a anode subassembly; a cathode subassembly; and an insulator disposed therebetween; wherein: the anode subassembly includes calcium hexaboride in a polymer matrix; and the cathode subassembly includes a hole to permit air to enter the battery. In some embodiments, the polymer matrix includes polyvinyldifluoride.

In another aspect, a method of using the battery described in the previous paragraph is provided, where the battery further includes a seal over the hole. Such methods include removing the seal and placing the battery in an electrical device configured to receive the battery. In some embodiments, the device is a hearing aid, a calculator, an infusion pump, or a pager.

In another aspect, a method of manufacture is provided including connecting a anode subassembly to a cathode subassembly with an insulator disposed therebetween; the anode subassembly including calcium hexaboride in a polymer matrix; and the cathode subassembly includes a hole to permit air to enter the battery. In some embodiments, the polymer matrix includes polyvinyldifluoride.

In another aspect, a device is provided including any of the above electrochemical cells, where the device is a hearing aid, a calculator, an infusion pump, or a pager.

BRIEF DESCRIPTION OF THE DRAWINGS

FIG. 1 is an illustration of an air battery cell, according to one embodiment.

DETAILED DESCRIPTION

In one aspect, calcium hexaboride ($CaB_6$) is used as an anodic material in an electrochemical cell that is an alkaline cell or an air cathode cell. $CaB_6$ provides an electrical capacity of 2.55 kAH/kg (gravimetric) and 6.26 kAH/L (volumetric), both of which are significantly higher than those of zinc, as set forth in Table 1.

TABLE 1

Computed gravimetric and volumetric capacities for zinc and calcium hexaboride:

| Material | Gravimetric Capacity (kAH/kg) | Volumetric Capacity (kAH/L) |
|---|---|---|
| Zn | 2.38 | 5.82 |
| $CaB_6$ | 2.55 | 6.26 |

$CaB_6$ has a cubic structure, with a unit cell having a Ca ion associated with an octahedron of boron atoms that are linked to boron atoms in adjacent unit cells. The alkaline, anodic redox reaction for $CaB_6$ is show in Scheme 1.

$$CaB_6 + OH^- \rightarrow CaO + 3B_2O_3 + 10e^- \qquad \text{Scheme 1:}$$

In Scheme 1, upon oxidation, the six boron atoms of a calcium hexaboride molecule are converted to three boron trioxide molecules with the release of 10 electrons. Formally, each boron with $\delta = \frac{1}{3}(-)$ oxidation state goes to a 3(+) oxidation state in the trioxide molecules.

Where the electrochemical cell is an alkaline cell, the cathode needs to be compatible with the calcium hexaboride anode. Thus, in some embodiments, the cathode includes an air cathode, or other cathodes including $MnO_2$, $CrO_3$, $KMnO_4$, peroxides, metal chlorates, metal bromates, metal iodates, and metals. One skilled in the art will appreciate that a variety of metals and metal ions may be used as cathodes. In one embodiment, the cathode includes an air cathode.

To assist in electron transfer and/or ion conductance, an electrolyte is used in electrochemical cells. Solvents for the electrolytes may be aqueous and may also be non-aqueous and include an ionic species that supports electron transfer between the electrodes. In alkaline cells, the electrolyte is an aqueous alkaline electrolyte. Examples of aqueous alkaline electrolytes may include alkaline species such as sodium hydroxide or potassium hydroxide. The electrolytes may also include suitable polymers such as polyethylene glycol, polyacrylonitrile, polycarbonates, or polymers containing sulfonate (—$SO_3^-$) or sulfone (—$SO_2$—) moieties. The electrolytes may also include a variety of additives. For example, suitable additives include, but are not limited to, surfactants, chelators, charged additives, and charged polymers. One illustrative example of a surfactant is the commercially available Triton surfactants. One illustrative example of a chelator is ethylenediaminetetracetic acid (EDTA). Illustrative examples of the charged additives include, but are not limited to, phosphates, phosphonates, and quaternary ammonium salts.

Where the electrochemical cell is an air cathode cell, the cell employs an electrolyte to support electron transfer within the cell. Electrolytes and additives disclosed above may also be used with air cathode cells. For the duration that the air cell is operative, for example, when powering a device, the solvents or the electrolytes in an air cell are non-volatile and stable under air contact. Electrolytes suitable for this purpose include, without limitation sodium hydroxide and potassium hydroxide. The electrochemical cell may also include a separator (e.g. for air/electrolyte segregation), a catalyst (e.g. for reducing the oxygen in the air), and a casing. The separator acts as an ion conductor between the electrodes, and also as an insulator to prevent internal short-circuiting. Illustrative catalysts include transition metal oxides, chalcogenides, and inorganic, and organometallic complexes. In some embodiments, the catalyst includes carbon, silver, and platinum. In other embodiments, the catalyst includes $N_4$-metal macrocycles, such as, tetra-aza-annulenes, porphyrins, and phthalocyanines, where the metal is Fe or Co, and which are active for oxygen reduction when supported on carbon and pyrolyzed at high temperatures between 700-1000° C.

The cells may further include current collectors (at either electrode). A current collector may include a porous carbon material. As used herein, the current collector is a conductive material through which ions/electrons are exchanged with an external circuit.

Solution phase reactions during oxidation of the calcium hexaboride anode may result in degradation of the calcium hexaboride, particularly in alkaline solution. To minimize such degradation, the calcium hexaboride may be encased with a coating. A variety of coatings well known to one of skill in the art may be used for the purposes of the present technology. Illustrative and non-limiting examples of such coatings include those formed from a metal oxide and a carbon allotrope, and may also include organic compounds. Illustrative metal oxide coatings include, but are not limited to, $ZrO_2$, $TiO_2$, SrO, $La_2O_3$, and ZnO. Coatings made from carbon allotropes include those made from diamond-like films and from amorphous carbon. Organic coatings may include acrylic and epoxide polymers.

In another aspect, a battery is provided including any of the above electrochemical cells. As an electrode, the calcium hexaboride may be pressed into a carbon-based electrode including, e.g., amorphous carbon or carbon black. The electrode may reside in a polymer matrix or may be sequestered in polyvinyldifluoride (PVDF). As an electrode, the calcium hexaboride may also be used neat or in an amorphous form. The battery may be a single cell or a multiple cell battery. Making and using other single cell batteries, such as, zinc-air button batteries, and other multiple cell batteries, such as automotive batteries are well known to one skilled in the art, and may be adapted according to the present technology based on this disclosure to make and use the batteries of the present technology.

Calcium hexaboride-air batteries have the potential to offer high gravimetric and volumetric energy densities, due to the use of atmospheric oxygen as the cathode reactant. The air electrode, the site at which the cathode reaction occurs, occupies very little internal volume and will not degrade throughout the discharge of the battery. The result is an increase in the volume available for the calcium hexaboride anode, which translates into higher overall capacity of such batteries. The calcium hexaboride air cells, and batteries including them, may also provide one or more of the following advantages: high energy density, flat discharge profile, excellent sealed shelf life, intrinsic safety, and low operating costs.

The present technology, thus generally described, will be understood more readily by reference to the following example, which is provided by way of illustration and is not intended to be limiting of the present technology.

EXAMPLE

A calcium hexaboride-air cell may include a calcium hexaboride anode, an aqueous alkaline electrolyte, and an air cathode. Power is derived from the reduction of oxygen at the cathode, and the oxidation of hexaboride at the anode, as shown above for the reaction of Scheme 1, vide supra, or as shown in a balanced equation such as:

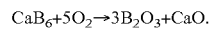

$$CaB_6 + 5O_2 \rightarrow 3B_2O_3 + CaO.$$

The anode in a calcium hexaboride air cell is calcium hexaboride. In the cell reaction, the hexaboride is oxidized to various borates and oxides of boron depending on the electrolyte used, depth of charge, operating voltage, and other factors.

The air cathode may include a solid interface through which the air is allowed to diffuse. The solid interface may include a mixture of carbon, Teflon, and a small amount of manganese dioxide pressed onto a nickel-plated screen. To the screen is then applied a Teflon layer on one side, and a separating membrane on the other, such that the Teflon layer allows oxygen to diffuse in and out of the cell, and also provides resistance to leakage. The separator acts as an ion conductor between the electrodes and as an insulator to prevent internal short-circuiting. The half reaction for the air cathode is shown below:

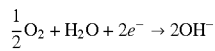

$$\frac{1}{2}O_2 + H_2O + 2e^- \rightarrow 2OH^-$$

Theoretical capacity of the air electrode is about 820 mAh/g, or about 4.79 ampere-hours per liter (0.079 ampere-hours per cubic inch) of molecular oxygen, which is roughly equivalent to one ampere-hour per liter of air.

The alkaline electrolyte employed in a calcium hexaboride-air cell is an aqueous solution of potassium hydroxide. Potassium hydroxide provides a ionic conductance between the anode and the cathode to permit efficient discharge of the cell.

A button cell battery configuration described by FIG. 1, and suitable, e.g., for hearing aids, calculators, infusion pumps, and pagers is one illustrative example of a battery configuration for a calcium hexaboride air cell. In such a cell 100, the anode subassembly includes an anode can 110 and an insulator 120. The anode can 110, which holds the calcium hexaboride anode 130, may be a tri-clad material including a copper interior lining, a stainless steel layer in the middle, and a nickel layer on the outside. The insulator 120 surrounds the anode can 110 and insulating it from the cathode can 140. A separator 160 isolates the calcium hexaboride anode 130 from the air cathode 150. The cathode subassembly includes the cathode can 140 and the air electrode 150. The cathode can 140 contains one or more air holes 170 to provide air access to the cathode 150. The air holes allow the oxygen to enter the cell.

Placed directly over the holes is a porous membrane that helps ensure uniform air distribution across the air electrode. On top of the membrane is a loose layer of Teflon to help form the cathode seal and the air cathode, which is oriented with its Teflon side toward the air holes. There is an interference between the ends of the nickel screen that protrude from the perimeter of the cathode, and the cathode can, to form a low resistance contact. The calcium hexaboride and the electrolyte are dispensed into the anode subassembly, over which the cathode subassembly is placed and sealed.

Battery cases may be made of injection molded plastic with porous inserts to allow air circulation around the cells. Some batteries may utilize a shrink-wrap plastic with air access ports. Cells are packaged to allow adequate and equal air access to each cell's air access ports.

Calcium hexaboride-air cells may be stored with an adhesive tab seal or, when in a battery, in a metalized plastic pouch that inhibits gas and vapor transfer. The batteries are ready for use when the seal or pouch is removed, allowing oxygen from the air to enter the batteries. In most cases, nominal voltage levels may be attained after the seal is removed.

The nominal open circuit voltage for a calcium hexaboride-air cell may be 1.4 Volts. The operating voltage during discharge is dependent on the discharge load and the temperature. The operating voltage per cell may range from 0.5 to 2 Volts. In other embodiments, the operating voltage per cell ranges from 1 to 1.5 volts.

To determine the energy density of a calcium hexaboride-air cell under specific conditions of load and temperature, the capacity in ampere-hours that the cell delivers under those conditions may simply be multiplied by the average discharge voltage, and divided by the cell volume or weight. The equations for gravimetric and volumetric energy densities are shown below.

Gravimetric Energy Density:

$$\frac{\text{(Drain in Amperes)} \times \text{(Service Hours)} \times \text{(Average Discharge Voltage)}}{\text{Weight of the cell (Kg)}} = \frac{\text{Watt-Hours}}{\text{Kg}}$$

Volumetric Energy Density:

$$\frac{\text{(Drain in Amperes)} \times \text{(Service Hours)} \times \text{(Average Discharge Voltage)}}{\text{Volume of the cell (liters)}} = \frac{\text{Watt-Hours}}{\text{liter}}$$

The energy density decreases as the cell get smaller, because the percentage of inactive materials, such as insulators, current collectors and cell containers consume proportionately more of the cell weight and volume.

Calcium hexaboride-air cells may be offered in a wide range of sizes and capacities. Calcium hexaboride-air cells may have capacities in the range of 500 mAh to 10 Ah. For larger power applications, cells with larger capacities may be used. As with all battery systems, performance of a calcium hexaboride-air cell is dependent on the discharge current. As an example, capacity may be plotted as a function of discharge current for various calcium hexaboride-air cells. Such plots may provide estimates of the effective capacities and may be used as a general guideline.

Due to the air-breathing property of calcium hexaboride-air cells, one may need to attend to the following factors. When calcium hexaboride-air batteries are used, an air access is required. Because air enters through the air access holes, e.g., in the positive cap of each cell, the holes may not be blocked. A variety of holes are known for other cells using air, and may be adapted according to the present disclosure by a skilled artisan.

In one embodiment, the can top is the anode and the can side wall is the cathode. If contact to the bottom of the cathode can is required, care should be taken to avoid the air holes. The shape of the battery bottom may either be flat or stepped.

The following design guidelines may aid in identifying the types of applications that calcium hexaboride-air batteries may serve. High capacity in a compact and lightweight form; (40-600 mAh in single button cells, depending on size, and up to 1,500 mAh in multi-cell batteries), low to moderate drain rates at an operating voltage of from 0.9 V to 1.25 V or a multiple thereof, continuous or frequent use that fully discharges the battery within a two- to three-month period, operation between 0° C. and 50° C., and long shelf-life when in a sealed state awaiting use. The calcium hexaboride air cell may be suited for devices that are used frequently or continuously, operate at low-to-medium drain rates, and require high energy density and low operating cost.

Hearing aids are a potential application for such an air cell because hearing aids are usually worn for up to 16 hours per day and have a low-to-moderate requirement for electrical current (a few milliamperes on average). Calcium hexaboride-air batteries may be used to power a number of medical devices, such as patient monitors and recorders, nerve and muscle stimulators, and drug infusion pumps. They may also be well suited for use in telecommunication devices such as pagers and wireless headsets.

Such calcium hexaboride-air cells can be combined in series and series-parallel connections to form a number of battery pack configurations. Such packs may be designed for use in communications equipment and emergency lighting products. Applications for such batteries include, without limitation, home health care devices (e.g. crib monitors), hearing aids (behind-the-ear and in-canal aids), pagers, patient monitors (telemetry transmitters), and portable data loggers.

Calcium hexaboride-air batteries may be supplied in the sealed state in a variety of packs, including, without limitation, one of the following packaging styles: two or more individual button cells sealed on one piece of adhesive tape, individual cells with their own tape seal (tab), and multicell batteries individually sealed in a metalized plastic pouch.

As with any electrochemical system, ambient storage temperatures of 21° C. or cooler are recommended for suitable capacity retention.

EQUIVALENTS

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms 'comprising,' 'including,' 'containing,' etc. shall be read expansively and without limitation.

Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase 'consisting essentially of' will be understood to include those elements specifically recited and those additional elements that do not materially affect the basic and novel characteristics of the claimed technology. The phrase 'consisting of' excludes any element not specified.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent compositions, apparatuses, and methods within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as 'up to,' 'at least,' 'greater than,' 'less than,' and the like, include the number recited and refer to ranges which can be subsequently broken down into subranges as discussed above. Finally, as will be understood by one skilled in the art, a range includes each individual member.

Other embodiments are set forth in the following claims.

What is claimed is:

1. An electrochemical cell comprising:
    an electrolyte; and
    an anode comprising calcium hexaboride in a polymer matrix;
    wherein, the electrochemical cell is an alkaline cell or an air cathode cell.

2. The electrochemical cell of claim 1, wherein the electrochemical cell is an alkaline cell.

3. The electrochemical cell of claim 2, wherein the electrochemical cell further comprises a cathode comprising a metal, $MnO_2$, $CrO_3$, $KMnO_4$, a peroxide, a metal chlorate, metal bromate, or metal iodate.

4. The electrochemical cell of claim 2, wherein the alkaline cell electrolyte comprises sodium hydroxide, potassium hydroxide, or a polymer.

5. The electrochemical cell of claim 2, where the cell further comprises a detergent, a chelator, a phosphate, a phosphonate, a quaternary ammonium salt, or a polymer.

6. The electrochemical cell of claim 1, wherein the electrochemical cell is an air cathode cell.

7. The electrochemical cell of claim 6, wherein the electrolyte comprises sodium hydroxide or potassium hydroxide.

8. The electrochemical cell of claim 5, wherein the cell further comprises a gelling agent, a stabilization agent, or a scavenging agent.

9. The electrochemical cell of claim 1, wherein the calcium boride comprises a coating.

10. The electrochemical cell of claim 9, wherein the coating is a metal oxide, a carbon coating, or a polymer coating.

11. The electrochemical cell of claim 10, wherein the coating comprises a carbon coating selected from the group consisting of diamond-like carbon and amorphous carbon.

12. The electrochemical cell of claim 10, wherein the coating comprises a metal oxide coating selected from the group consisting of $ZrO_2$, $TiO_2$, $SrO$, $La_2O_3$, and $ZnO$.

13. A battery comprising the electrochemical cell of claim 1.

14. A device comprising the electrochemical cell of claim 1, wherein the device is a hearing aid, a calculator, an infusion pump, or a pager.

15. The electrochemical cell of claim 1, wherein the polymer matrix comprises polyvinyldifluoride.

16. The electrochemical cell of claim 1, further comprising:
    a cathode; and
    an insulator disposed between the anode and the cathode.

17. A battery comprising:
    an anode subassembly;
    a cathode subassembly; and
    an insulator disposed therebetween;
    wherein:
        the anode subassembly comprises calcium hexaboride in a polymer matrix; and
        the cathode subassembly comprises a hole to permit air to enter the battery.

18. The battery of claim 17, wherein the polymer matrix comprises polyvinyldifluoride.

19. A method of using the battery of claim 17, the battery further comprising a seal over the hole, the method comprising removing the seal and placing the battery in an electrical device configured to receive the battery.

20. The method of claim 19, wherein the device is a hearing aid, a calculator, an infusion pump, or a pager.

21. A method of manufacture comprising:
    connecting a anode subassembly to a cathode subassembly with an insulator disposed therebetween;
    the anode subassembly comprising calcium hexaboride in a polymer matrix; and
    the cathode subassembly comprises a hole to permit air to enter the battery.

22. The method of claim 21, wherein the polymer matrix comprises polyvinyldifluoride.

* * * * *

UNITED STATES PATENT AND TRADEMARK OFFICE
CERTIFICATE OF CORRECTION

PATENT NO. : 8,435,312 B2  
APPLICATION NO. : 13/123612  
DATED : May 7, 2013  
INVENTOR(S) : Chen Page 1 of 1

It is certified that error appears in the above-identified patent and that said Letters Patent is hereby corrected as shown below:

In the Specification

In Column 1, Line 61, delete "a anode" and insert -- an anode --, therefor.

In Column 2, Line 9, delete "a anode" and insert -- an anode --, therefor.

In Column 3, Line 10, delete "ethylenediamminetetracetic" and insert -- ethylenediaminetetraacetic --, therefor.

In the Claims

In Column 8, Line 55, in Claim 21, delete "a anode" and insert -- an anode --, therefor.

Signed and Sealed this  
Eighth Day of October, 2013

Teresa Stanek Rea  
*Deputy Director of the United States Patent and Trademark Office*